United States Patent
Bröndrup (10) Patent No.: US 7,315,823 B2
(45) Date of Patent: Jan. 1, 2008

(54) WIRELESS RESERVATION, CHECK-IN, ACCESS CONTROL, CHECK-OUT AND PAYMENT

(75) Inventor: Rayner Bröndrup, Asker (NO)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/788,402

(22) Filed: Feb. 21, 2001

(65) Prior Publication Data

US 2003/0208386 A1    Nov. 6, 2003

(30) Foreign Application Priority Data

Feb. 25, 2000 (NO) .................................. 20000491

(51) Int. Cl.
*G06Q 99/00* (2006.01)
(52) U.S. Cl. ............................................. 705/1; 705/5
(58) Field of Classification Search .................... 705/1, 705/5
See application file for complete search history.

(56) References Cited

U.S. PATENT DOCUMENTS

| | | | | |
|---|---|---|---|---|
| 4,931,789 A | * | 6/1990 | Pinnow | 340/5.64 |
| 5,614,703 A | * | 3/1997 | Martin et al. | 235/382 |
| 5,732,398 A | * | 3/1998 | Tagawa | 705/5 |
| 5,948,040 A | * | 9/1999 | DeLorme et al. | 701/201 |
| 5,979,754 A | * | 11/1999 | Martin et al. | 235/382 |
| 6,094,640 A | * | 7/2000 | Goheen | 705/5 |
| 6,161,005 A | * | 12/2000 | Pinzon | 455/403 |
| 6,223,029 B1 | * | 4/2001 | Stenman et al. | 455/420 |

(Continued)

FOREIGN PATENT DOCUMENTS

EP        715445 A2  *  6/1996

(Continued)

OTHER PUBLICATIONS

"Smart phones: new alliance further Geoworks' plan to deliver valuable content, interactive service to smart phone customers." Edge, on & about AT&T, v12, p. 26 (1), Feb. 10, 1997.*

(Continued)

*Primary Examiner*—Jonathan Ouellette
(74) *Attorney, Agent, or Firm*—Nixon & Vanderhye P.C.

(57) ABSTRACT

A system and method for, by means of a mobile terminal, wireless hotel search and selection, reservation/booking, check-in, room access control, check-out and payment services for hotel customers is disclosed. The mobile terminal (1) comprises a mobile telephone and processing unit (23), operating with wireless applications, for wireless communication (2) with a hotel search and reservation server (12) and a reservation/IT system (7) of a selected hotel, and a short-range wireless device (25) for wireless communication (10) with wireless devices (9,16) of door locks (32) and user locating arrangements, respectively. By means of the wireless application of the mobile terminal (1), the user reserves a hotel room. A hotel room key token is transferred from the reservation/IT system (7) to the wireless device (35) of the mobile terminal, and hence to the wireless door lock (9,32). When the terminal (1) and the wireless door lock (9,31) are in-range, the hotel room key token is transferred from mobile terminal (1) to the wireless door lock (9,32), the door is unlocked and check-in is registered. On departure, exit or expiration of the reservation period, the system provides wireless check-out and electronic bill settlement.

10 Claims, 8 Drawing Sheets

WAP hotel reservation - Bluetooth check-in and check-out
Check-in and door lock activation

U.S. PATENT DOCUMENTS

| | | | |
|---|---|---|---|
| 6,295,448 B1* | 9/2001 | Hayes et al. | 455/420 |
| 6,386,451 B1* | 5/2002 | Sehr | 235/384 |
| 2001/0016825 A1* | 8/2001 | Pugliese et al. | 705/5 |
| 2002/0049535 A1* | 4/2002 | Rigo et al. | 701/211 |
| 2002/0087655 A1* | 7/2002 | Bridgman et al. | 709/217 |

FOREIGN PATENT DOCUMENTS

| | | |
|---|---|---|
| JP | 2000224664 A * | 8/2000 |
| WO | WO 98/49818 | 11/1998 |
| WO | WO 00/04476 | 1/2000 |

OTHER PUBLICATIONS

Stevens, Cindy Loffler, "The new Web phones," Wireless Review, v16n12, pp. 50-53, Jun. 15, 1999.*

"Microsoft, Ericsson Announce Strategic Partnership to Drive Mobile Internet Market." PR Newswire, Dec. 8, 1999.*

"WapWorld- The UK's First Independent WAP Enabled Mobile Telephone Information Service Launcehed by Jingo Communications." Business Wire, Jan. 12, 2000.*

Radell, Michael B., "Online vs. off-line: understanding hotel access-control systems." Hotel & Motel Management, v210, n19, p. 98(2), Nov. 6, 1995.*

Worcester, Barbara A., "On-line locks may set trend toward real-time security," Hotel & Motel Management, v213, n3, pp. 53-54, Feb. 16, 1998.*

* cited by examiner

WIRELESS RESERVATION, CHECK-IN, ACCESS CONTROL, CHECK-OUT AND PAYMENT

FIELD OF THE INVENTION

The present invention relates to the field of provision of wireless services for reservation, check-in, access control, check-out and payment, preferably for hotel customers by means of wireless application programs employing standard protocols operating on wireless user terminals provided with a wireless long or medium range communications and processing unit, such as a mobile telephone, and wireless short range device, such as a device complying with the Bluetooth industry standard.

The Problem Areas.
  The invention addresses the following problem areas:
  The problem of a traveller on the move to find a suitable hotel, particularly in foreign cities.
  The problem of a traveller on the move who has to rely on the opening hours of travel agencies for finding hotels.
  The problem of a traveller on the move of sitting in long and costly telephone 'waiting lines' with travel agencies to make hotel reservations.
  Hotels difficulties in reaching the customers directly when they are looking for hotels in given areas.
  Hotels challenge in building loyalties with frequent travellers.
  Problems related to long check-in and/or check-out lines in many hotels for guest check-in, check-out and bill settlement.
  Problems related to operation of locks requiring manual operations.

Known Solutions and Problems with These.
  When wanting to book a hotel room, travellers often find themselves in long travel agency telephone 'waiting lines'. In addition, once a connection has been established, the communication with the travel agency agent introduces a distortion between the hotels' information and the traveller, e.g. in the understanding of hotel standard, quality, service level, etc. This occasionally makes the finding of a suitable hotel room slow, and unsafe as to whether the traveller is really getting what he/she requests. In addition the traveller is dependent on the travel agency's opening hours for the reservation/booking of hotel rooms in foreign cities.

For the hotel this also makes loyalty building and marketing to the end customer more difficult, since the travel agency, with it's agreements with different hotels, is the interface of traveller.

Norwegian patent publication no. NO 179888 to Ohrn discloses a system and method suitable for remote services searching, making reservations, ordering and confirming of orders, but does not provide for wireless registration, hotel check-in, room access control, hotel check-out and payment.

Another problem is the hotel check-in and the key for the hotel room door lock. The opening of a traditional hotel room door lock requires that the customer has been checked in through the reception desk, at which there is at times a long queue waiting for check in, very often to the business travellers annoyance and irritation. Existing hotel room door locks that can be electronically programmed from the hotel reception desk to accept only the key given to the customer. To operate the door locks, the locks require that the user inserts some form of physical key.

U.S. Pat. No. 5,614,703 to Martin et. al. discloses a system and for hotel check-in and check-out without the need for a desk clerk, wherein guest registration etc. is done by reading a card by means of a card reader, such as a magnetic credit card reader, located at the reserved hotel room.

Yet another problem is hotel check-out and payment. When leaving the hotel, the traveller often has to wait in a long check out line to settle the bill—while at times risking to be late for an important meeting or even to miss a flight.

On-line reservation/booking by means of Internet requires an Internet connection which may be a problem for the traveller when the traveller does not carry along a computer or a similar device which is capable of accessing the Internet. However, if the traveller should happen to have such a device, the start up of the device is still needed, and if the connection between the device and the Internet is made by means of a mobile telephone, a rather slow connection through a mobile phone will typically result in long connection times and, consequently, expensive phone bills. To alleviate this problem, hotel reservation/booking applications based on the Wireless Application Protocol (WAP) are also currently being developed and tested in various locations. However, to the knowledge of the applicant, none of these combine all of the following elements or services:
  Search for a hotel that matches the user's preferences
  Provision of a selection if several choices exist
  Payment integrated with the reservation/booking
  Provision of a reference number (booking token) that both serves as a receipt for accepted payment and as a key parameter in the communication protocol for door lock opening.

OBJECTS OF THE INVENTION

It is an object of the invention to provide a system and a method that alleviates a number of the above mentioned problems and limitations of the prior art systems, and which also integrate functions of previously separate systems to provide wireless hotel search, reservation/booking, check-in, room access control, check-out and payment services for hotel customers.

BRIEF DISCLOSURE OF THE INVENTION

In one aspect of the present invention, the invention provides a system providing wireless hotel search and selection, reservation/booking, check-in, room access control, check-out, and payment services for hotel customers by combining a wireless application for hotel search and reservation/booking services, a aireless application for check-out and payment services, and wireless hardware and applications for hotel locks. Systems according to the invention can include a plurality of mobile terminals, each mobile terminal having a short range wireless device and a long or medium range wireless communications and processing unit, at least one hotel search and reservation/booking serve means, and a plurality of hotel reservation/information technology (IT) systems to the communication network means and communication network means allowing these to communicate, wherein each such hotel reservation/IT system is in communication with an associated plurality of corresponding wireless devices associated with locks such as electrically operable door locks. The door lock wireless devices are short range devices capable of communicating with compatible wireless devices of in-range mobile terminals. Preferably, the wireless devices of the mobile terminals and the wireless door locks are devices complying with the Bluetooth industry standard. Systems according to the invention further include electronic payment server means capable of communicating with other elements of the system by means of said communication network means.

Optionally, systems according to the invention can also include additional short range wireless devices associated with and communicating with the hotel reservation/IT system for providing communication with nearby compatible and appropriately adapted mobile terminals. Such additional devices can be installed at the entrances and/or exits of a hotel employing a system according to the invention In another aspect of the present invention, the invention provides a method providing wireless hotel search and selection, reservation/booking, check-in, room access control, check-out and/or payment services for hotel customers by means of a system combining wireless application for search and reservation/booking services, a wireless application for check-out and payment services, and wireless hardware and applications for hotel door locks. A method according to the invention can include the steps of a user by means of a properly adapted wireless mobile terminal connecting to a hotel search and reservation/booking server, searching for, finding and selecting a suitable hotel, sending a reservation/booking request and optionally information on a preferred method of payment to a connected hotel reservation/IT system and thereby making a reservation, receiving by the wireless long or medium wireless communications and processing unit of the mobile terminal a reservation/booking request confirmation including a key token, transferring the key token from the communications and processing unit to the wireless device of the mobile terminal, transmitting from the hotel reservation/IT system the key token to a wireless device associated with a door lock of the reserved hotel room, and, upon arrival at the hotel of the user carrying the mobile terminal, wirelessly, by means of the wireless device of the mobile terminal, transmitting the key token to nearby wireless devices associated with electrically operated door locks whereby, on receiving the appropriate key token, the arrival of the user is registered in the hotel reservation/IT system, and the door lock wireless device of the reserved room unlocks the door. Further, a method according to the invention includes, for user check-out from the hotel, the additional steps of a user, by means of the mobile terminal, connecting to a hotel search and reservation/booking server, and, while connected to the hotel search and reservation/booking server, communicating to the hotel reservation/IT system a check-out request, receiving therefrom bill information, sending thereto a bill acceptance, receiving from a payment server a payment authorisation request, sending thereto a payment authorisation response, and by the hotel reservation/IT system, upon receiving receiving a payment verification, sending a key token deactivation message to the door lock associated wireless device of the reserved room. Further, the method can include steps of encryption, whereby the key token is encrypted to become an encrypted secret key.

DETAILED DESCRIPTION OF THE EMBODIMENTS

In the following, with reference to the accompanying drawings, the invention will be explained by way of example.

Figure 1:
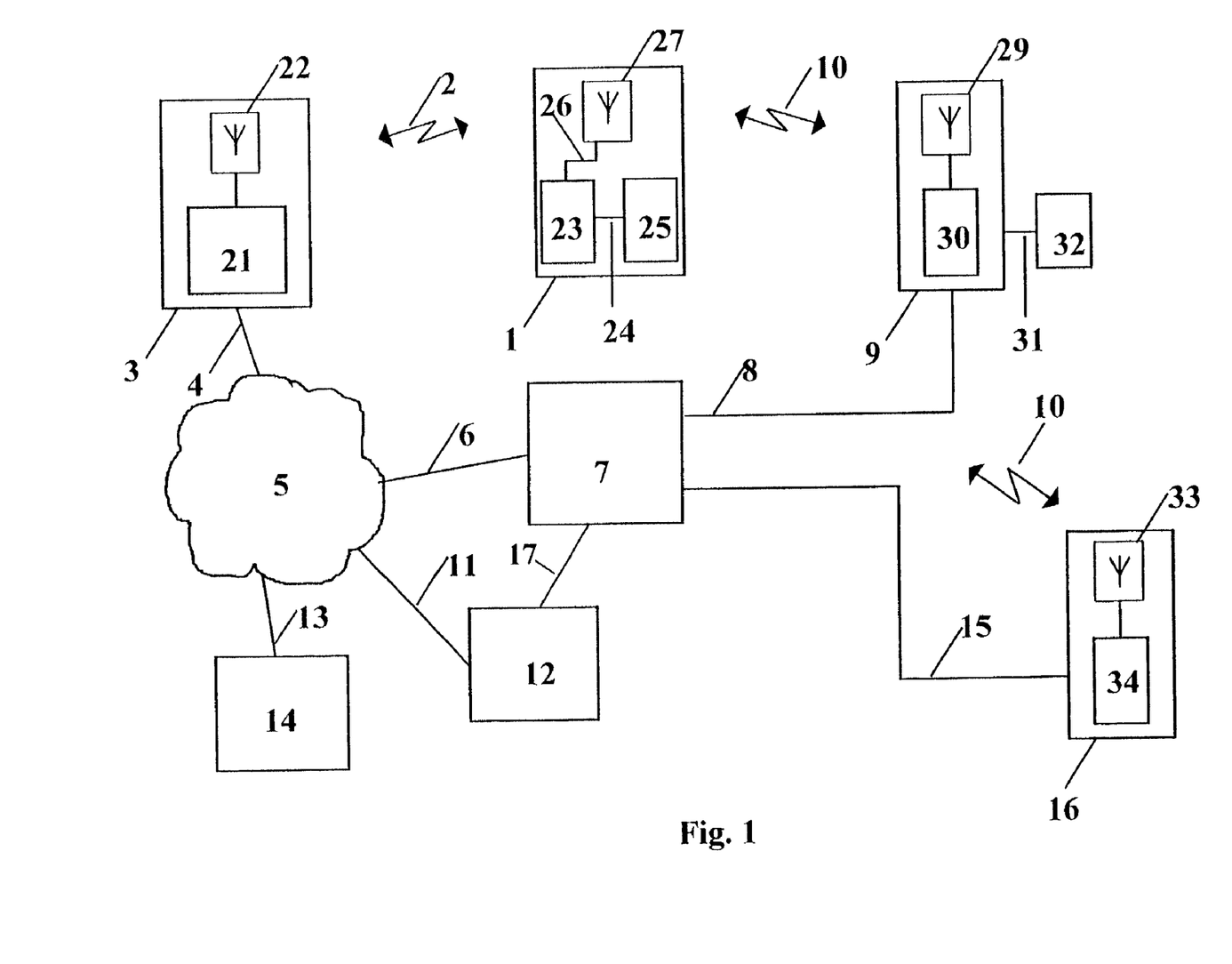
FIG. 1 is a simplified block diagram of an example of a system for wireless hotel search, reservation/booking, check-in, room access control, check-out and payment services according to the invention.

In FIG. 1 is shown a simplified block diagram of an exemplary system embodying the system of invention. The exemplary system includes a plurality of portable wireless mobile terminals 1 capable of wireless communication 2 with a plurality of base stations 3 which have connections 4 to a communication network 5. Each mobile terminal 1 of the system in this example includes a typical mobile telephone and processing unit 23 provided with appropriate wireless application programs and with a connection 26 to an antenna system 27. The mobile wireless terminal 1 of the example also includes a short range wireless device 25 with a built-in antenna (not shown) and with a connection 24 to the mobile telephone and processing unit 23. The telecommunication network 5 has connections 6 to a plurality of hotel reservation/IT systems 7 and connections 11 to at least one hotel search and reservation server 12. Optionally, one or more hotel search and reservation server 12 can have direct links 17 to or be integrated with hotel reservation/IT system 7 of the system. Each hotel reservation/IT system 7 has a plurality of connections 8 to a plurality of short range wireless devices 9, wherein each wireless device 9 is provided with a connection 31 to an associated door lock 32 which can be operated by the associated wireless device 9. Optionally, the hotel reservation/IT system 7 can have connections 15 to wireless devices 16 located preferably at entrances/exits of the hotel. For wireless payment services, the system includes at least one payment server 14 with a connection 13 to the telecommunication network 5. The wireless devices 25 can communicate with in-range wireless devices 9 and 16 by means of wireless connections 10. For simplicity, in FIG. 1, only one unit or device is shown for each element, however, a typical system may equally well comprise a plurality of such units or devices.

Figure 2:
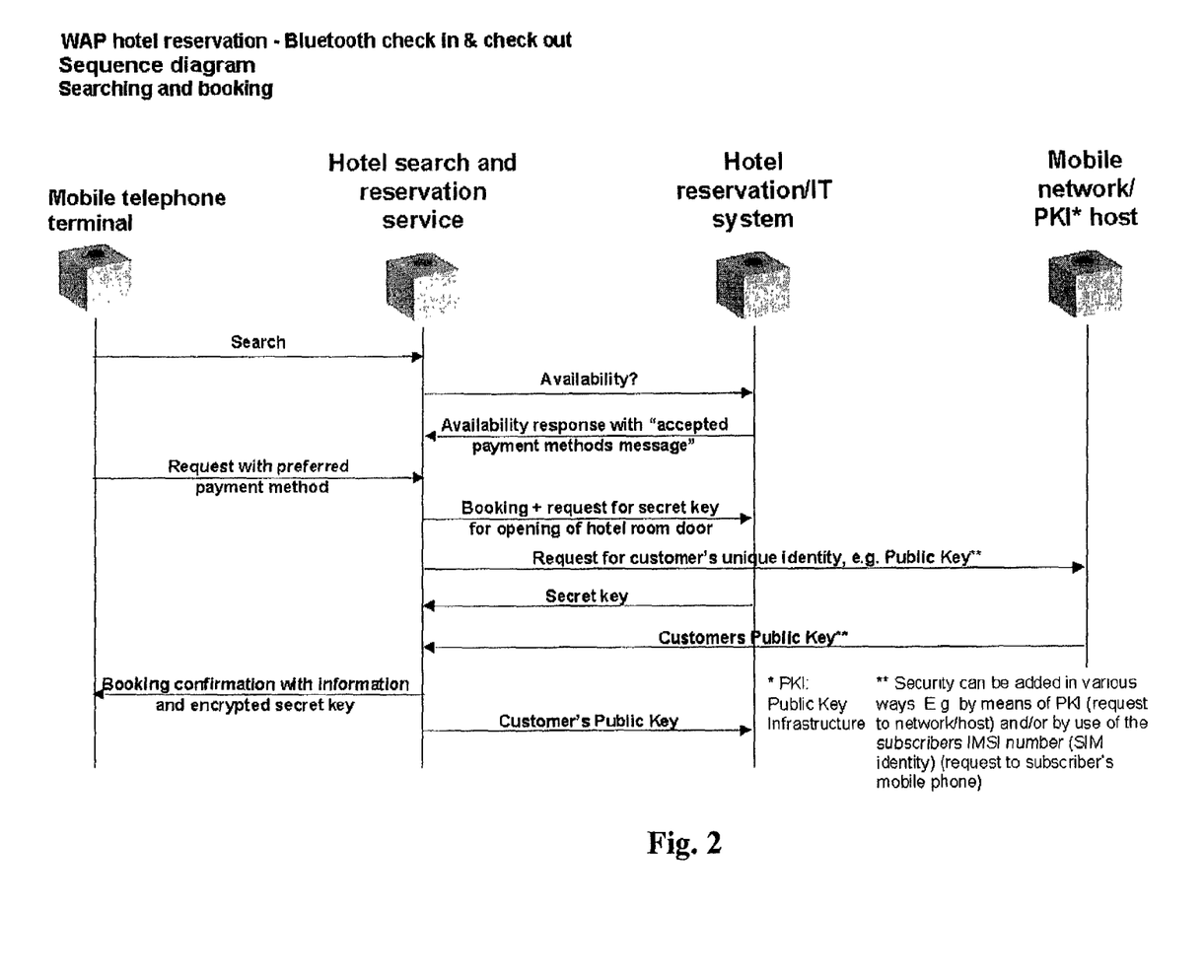
FIG. 2 is a sequence diagram illustrating an example of steps of wireless hotel search, reservation/booking and key token transfer of an example of a method according to the invention.

With reference to FIG. 2, in one aspect of an embodiment of a method of the invention, the invention provides for wireless hotel reservation/booking by a user. The search for hotels and the possibility to book rooms in accordance with requirements of a user is provided through a WAP interface. The hotel reservation/booking of this example is performed mainly in two stages:
  i. the user searches for a hotel to find one that matches the required criteria;
  ii. the user makes a reservation/booking request in which the actual reservation/booking is performed.

In the first stage (i), the hotel search of the example is performed by a per se known search engine, intelligent agent or other available means which has access to one or several hotel reservation/booking systems. The user criteria for selecting a hotel can be parameters like location, price, features of the hotel etc. The user interface presented to the user on the mobile terminal can be implemented suitably by any suitable application means, e.g known application means such as WAP (WML/WML Script), typical Web applications (HTML/Java Script) or Java Application/Applet. The server side of the application can be built using by means of standard Web application models or other suitable means. In the second stage (ii) of the hotel reservation/booking, the hotel reservation/booking is performed through a wireless application that communicates with the reservation/booking system of the chosen hotel using standard mechanisms according to any suitable application means, such as Wireless Mark-up Language (WML) forms or the ones described above. The user or a user controlled application on the mobile terminal inputs the necessary data needed to perform the reservation/booking and a receipt confirming the reservation/booking is received from the reservation/booking system.

Also with reference to FIG. 2, in another aspect of an embodiment of a method of the invention, the reservation/booking receipt from the hotel reservation system contains a key token such as e.g. a reference number which can be directly used for obtaining access to the reserved room upon arrival at the hotel.

Optionally, as shown in FIG. 2, security can added to the above, e.g. through the use of PKI (Public Key Infrastructure).

Figure 3:
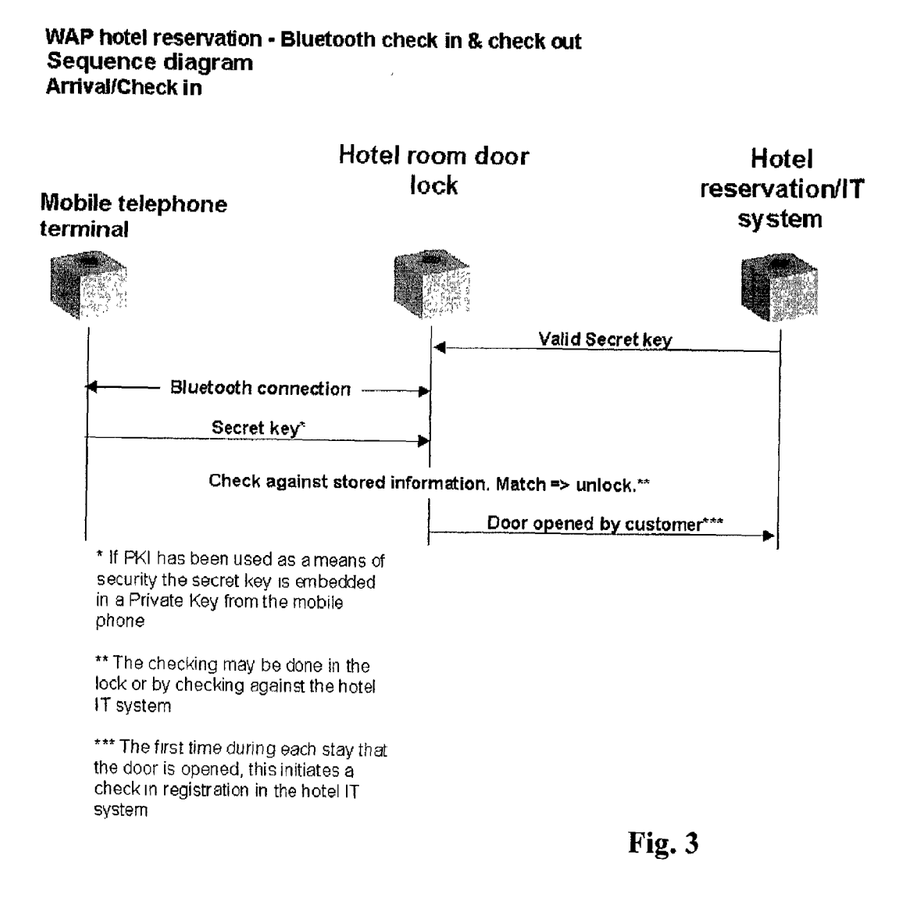
FIG. 3 is a sequence diagram illustrating an example of steps of wireless hotel door unlocking and guest registration of an example of a method according to the invention.

Now, with reference to FIG. 3, in a further aspect of an embodiment of a method of the invention, the invention provides for wireless operation of hotel room door locks. After successful reservation, the wireless door lock system of the reserved room receives information about the valid key token, or a secret key, from the hotel reservation/IT system. By means of the short range wireless device in the mobile wireless terminal, the key token is transmitted to nearby wireless devices associated with electrically operable door locks. On receiving the appropriate key token from the wireless device in the mobile wireless terminal, the door lock wireless device of the reserved room can notify the associated hotel reservation/IT system of the arrival of the user for check-in, and unlocks the door. The user is notified of the event, and is given the opportunity to control the door lock by means of a suitable user interface on the mobile wireless terminal. A situation of use of the method explained above is also illustrated in FIG. 6.

The communication protocol between the mobile terminal and the wireless door lock system is performed over a Bluetooth, Infrared or other suitable bearer. To achieve optimal security, this information could be protected in the user's terminal by means of a PIN code, fingerprint or other local authentication methods.

The protocol as described can be implemented in several ways; as a generic protocol that uses the Bluetooth data transport directly for information exchange, or it may be implemented using e.g. WAP as a transport mechanism.

Figure 4:
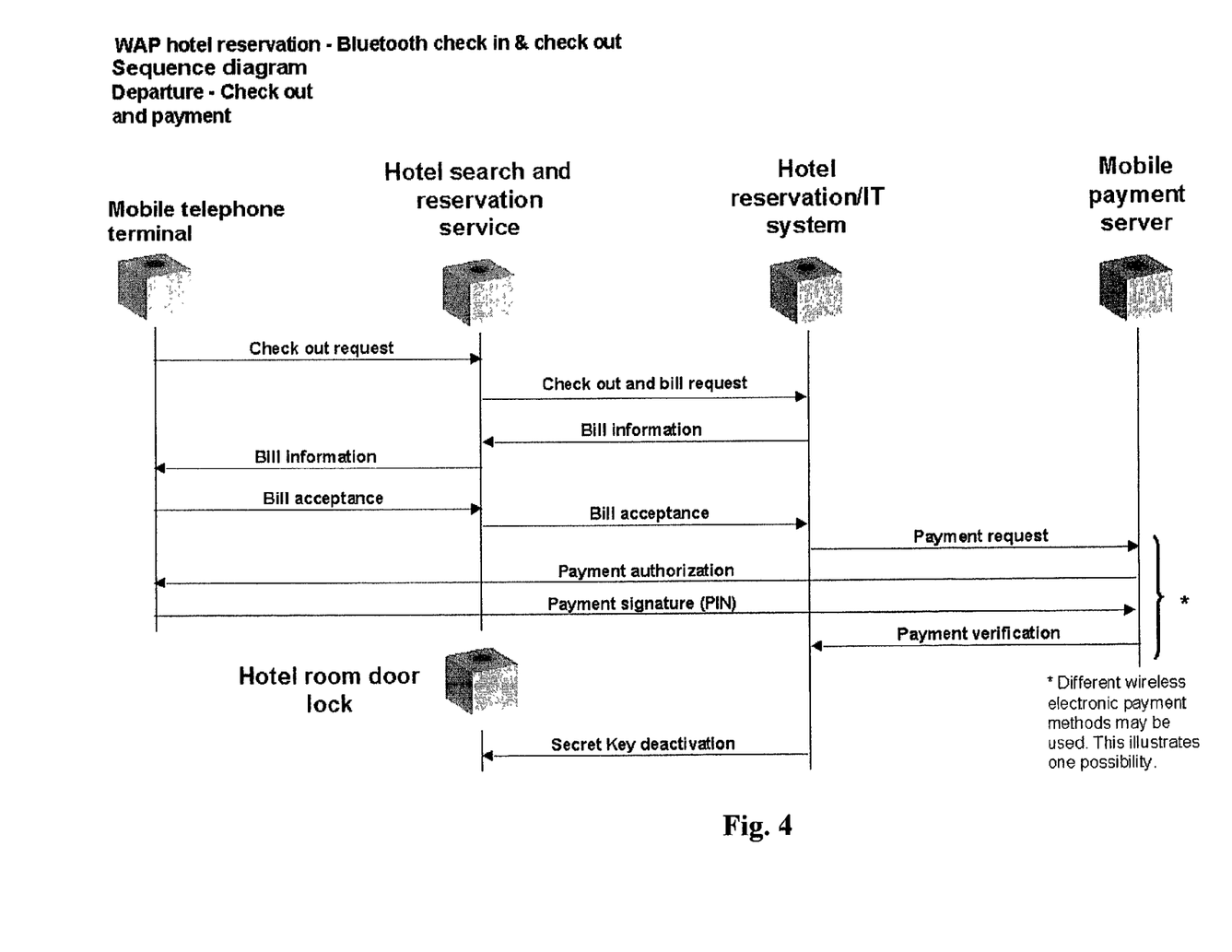
FIG. 4 is a sequence diagram illustrating an example of steps of wireless hotel check-out, billing, payment and key deactivation of an example of a method according to the invention.

Conventional electrically operated hotel room door locks employed by a system according to the invention may be equipped with Bluetooth chips and functionality. Together with WAP mobile phones equipped with wireless Bluetooth compliant devices, this makes possible mechanisms which may provide new value added services as described below. Such mechanisms may work in the following way:

Now, with reference to FIG. 4, in yet another aspect of an embodiment of a method of the invention, the invention provides for wireless user check-out from the hotel and wireless hotel bill payment. By means of the properly adapted mobile wireless terminal, connection is made to the hotel search and reservation/booking server. While connected to the hotel search and reservation/booking server, a check-out request is communicated to the hotel reservation/IT system by means of a communications network. The hotel reservation/IT system responds by sending back bill information, and the user responds by sending a bill acceptance or rejection message. On receiving the acceptance of the user, the hotel reservation/IT system sends a payment request to the payment server which in turn sends a payment authorisation request to the user. The user then responds to the payment server by sending a payment authorisation message back to the payment server. In turn, the payment sends a payment verification message to the hotel reservation/IT system verifying that the bill has been paid electronically. Upon receiving the appropriate messages, the hotel reservation/IT system can send a key token deactivation message to the door lock associated wireless device of the reserved room.

A wireless application for service can be used for checking out of hotels and settling the hotel bill. In this way the customer will not need to wait in a check-out line at the check-out counter of the hotel before leaving the hotel. This application can be implemented as a standard "electronic commerce" type application which may additionally use information collected directly from a wireless Bluetooth-enabled door lock. From his/her application on the mobile terminal the user can initiate the proper check-out mechanism, such as e.g. if additional charges shall be incurred for late check-out. The application can use standard available secrecy and privacy mechanisms such as Secure Socket Layer (SSL), Secure Electronic Transfer (SET) or similar to protect the payment information.

Figure 5:
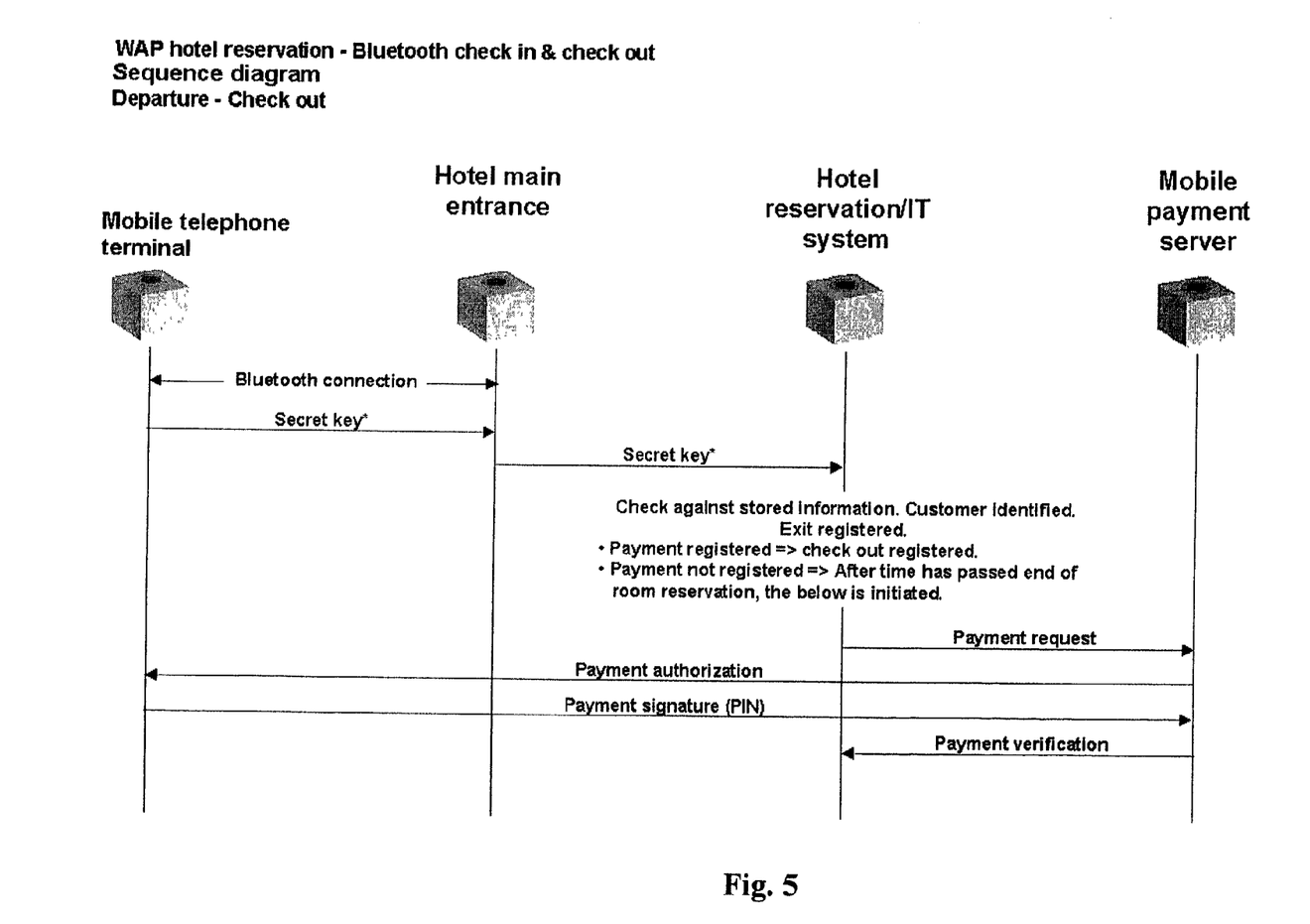
FIG. 5 is a sequence diagram illustrating an example of steps of wireless hotel departure registration, check-out, billing and payment of an example of a method according to the invention.
Figure 7:
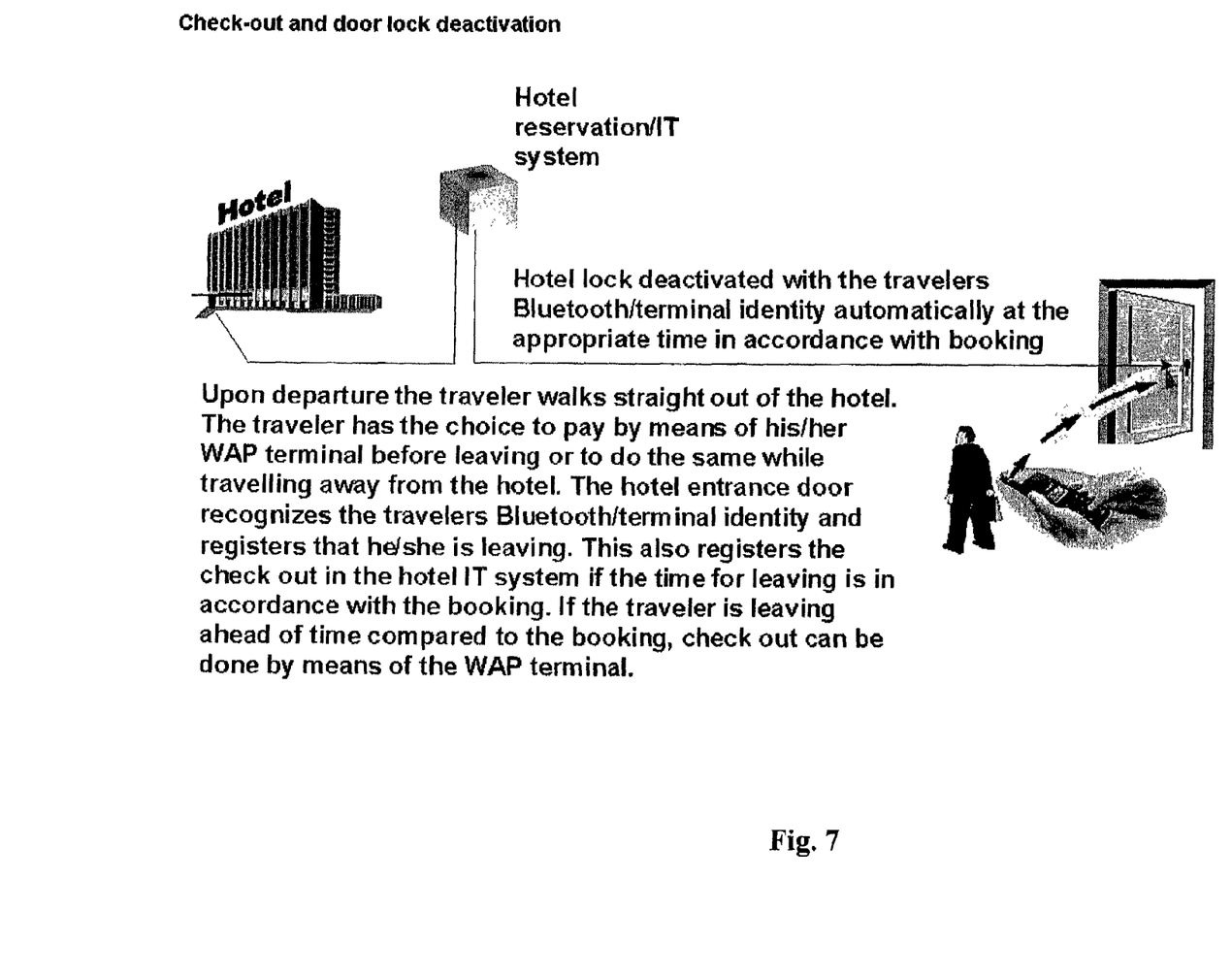
FIG. 7 illustrates an example of a hotel guest departure scenario for wireless and automatic hotel door lock deactivation and automatic or manual guest check-out registration employing the invention.

Now, with reference to FIG. 5, in yet another aspect of an embodiment of a method of the invention, the invention provides for wireless user check-out from the hotel and electronic hotel bill payment. In contrast to what was explained above with reference to FIG. 4, the additional aspect of the hotel check-out and electronic hotel bill payment illustrated in FIG. 5 is the triggering of automatic check-out or generation of a payment request from the hotel reservation/IT system to the payment server after exit registration or expiration of the reservation period. If the payment is registered on or prior to the registration of exit, then the check-out is registered. If the reservation period expires and the payment is not registered on or prior to the expiration of the reservation period, then the automatic generation of the payment request can be triggered. A situation of use of the method explained above with reference to FIGS. 4 and 5 is also illustrated in FIG. 7.

Figure 8:
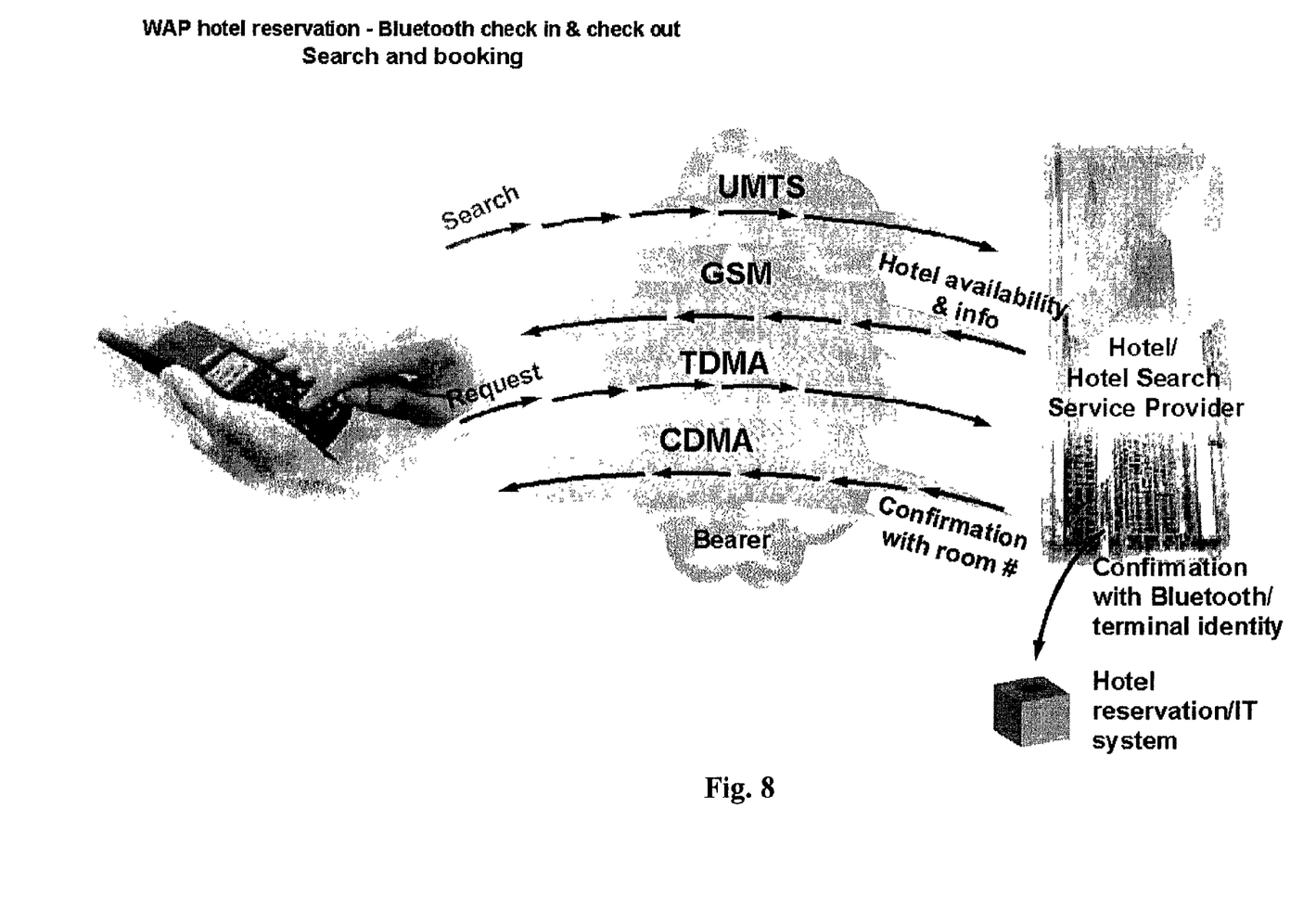
FIG. 8 illustrates examples of possible bearers in a wireless system according to the invention.

With reference to FIG. 8, examples of bearers such as the standardised UMTS, GSM, TDMA and/or CDMA which can be employed by the Wireless application for mobile terminals and associated mobile networks in a system according to the invention is shown.

Other Useful Aspects of the Invention.

Using a wireless application reservation service for flight tickets combined with the use of the Bluetooth technology, the customer will not need a flight ticket, and the Bluetooth phone could even be the 'boarding pass' letting the traveller through the boarding gate of an airport. The same principle can be used in cinemas, mueseums, concerts and other such venues requiring a pass for entering.

Adding the use of automatic mobile localising applications will enable features as 'show me the nearest hotel (corresponding to my preferences)'. It will also enable services like supplying a digital map of how, and by what means of transportation, to get to the hotel from where the traveller is—together with the room confirmation.

By using wireless devices complying with the Bluetooth technology industry standard in conjunction with house door locks, the door may e.g. be locked at all occasions, except for when someone living in the house, and whose identity in accordance with the Subscriber Identity Module (SIM) of the mobile wireless terminal has been programmed into the lock, is approaching—then the door lock unlocks automatically. For the user, there will be no need to pick up keys when carrying shopping bags or small children—the user can just walk right in, or out. Combined with a motorised door opener, a secure hands-free door opening system can be provided, to the advantage of people in general and in particular for disabled persons. In addition, such wireless locks could also be opened using Bluetooth 'keys', traditional keys and/or special Bluetooth 'key' devices with built in Bluetooth technology.

In intelligent homes the unlocking and locking of the entrance door could also be combined with an alarm, with a function telling the residensee about unlocked windows or terrace doors, or even with a function that will automatically lock all windows and terrace doors when the last residensee holding a Bluetooth equipped phone or 'key' is leaving the house.

Car door locks can be equipped with wireless locks according to the invention. With wireless locks employing Bluetooth technology, the mobile phone may also function as a starter key—with Bluetooth connection; all that's needed is to push a button on the terminal to start the engine. Without the Bluetooth connection there will be no possibility to start. Thus, this also provides increased car theft protection.

The invention, and in particular the wireless hotel search and reservation/booking, makes it possible for hotels and hotel chains to get closer to the customer and to easier build loyalties with the customers. For the travellers it means a considerable improvement in ease of finding a suitable hotel—also when visiting a city for the first time, or e.g. when the favourite hotel is fully booked.

For the hotels this is a possibility to provide value added services, and for building customer loyalty—the customer will have his/her favourite hotel or hotel chain WAP reservation address programmed into the mobile phone, knowing that upon arrival, after making a reservation through the WAP hotel room reservation service, all he/she needs to do is to walk right up to the room that's been prepared for his/her arrival. The service also opens the door for the hotel(s) to keep track of the customer's preferences and customer profile, thus making it possible for the hotel(s) to tailor services for loyal customers.

A system according to the invention can be set to terminate the function of the Bluetooth phone as a key for the hotel room door lock after the customer exits the room after payment, after the customer leaves the hotel after payment, or after a certain time of the departure day, depending on the hotel wishes. For travellers in hurry, it will even be possible to settle the bill after the departure from the hotel, by use of the WAP check out and payment service. The service may have built in functions that prevent customers from escaping from hotel bills. If the customer has not actively settled the bill the WAP check out and payment service may prompt the customer to do so after a certain hour of the check out day. If the customer has still not settled the bill after a certain, pre-set time, the bill will be automatically settled through the chosen electronic payment method.

Advantages

With the WAP hotel room reservation service the customer can be able to choose the hotel corresponding the best to his/her requirements. The WAP hotel room reservation service may, upon or in conjunction with confirmation of the reservation, send a message to the phone, including the hotel room number. Thus, even before the arrival at the hotel, the customer may know which room he/she has been assigned, and is then able go directly to the room without having to make a check-in at the reception desk of the hotel.

When the traveller approaches the hotel room, the hotel room door lock senses, by means of the wireless Bluetooth technology, the WAP and Bluetooth enabled mobile terminal, and when a security code is implemented, the latter provided either through the WAP reservation service and stored in the mobile terminal, or from the customers unique SIM card identity, and registered with the hotel, compares it with a security code automatically programmed into the lock through the WAP hotel room reservation service, and opens the door. When unlocking the door in this way for the first time at each stay, the check-in at the hotel may be automatically registered by the hotel reservation/IT system. In this way, the customer's mobile terminal functions as a wireless unique electronic key to his/her room until checking out, and at that time the WAP check-out and payment service may be used.

When the customer is leaving the hotel he/she can settle the bill by means of a WAP check-out and payment service provided by the system. The service will make it possible for the customer to check the bill before leaving, and to approve payment of it. The payment can be done through any electronic payment method chosen in the service implementation (if more than one method is available, the customer preferably chooses the preferred method of payment at the time of reservation of the hotel).

Using this invention, a WAP and Bluetooth equipped mobile terminal, and the associated WAP services, the customer experiences an immense increase in ease and flexibility of hotel reservation and in ease of finding hotels and rooms that correspond to personal and corporate requirements. In addition the customer avoids both check in and check out queues. The customer will thus enjoy increased flexibility and ease of use when staying at hotels providing this service.

The invention claimed is:

1. A system for a hotel for wireless facility reservation and/or check-in and/or check-out and for facility access control, comprising:

a communication network interconnecting a telecommunication system adapted to communicate wirelessly with a wireless telecommunication device of a wireless terminal of a user and a computerized reservation/IT system associated with a facility, said computerized reservation/IT system including a means for electronic communication with a remotely operable door lock of the facility, said remotely operable door lock including a lock device and a first wireless device operationally associated with the lock device and adapted to communicate wirelessly with a second wireless device of the wireless terminal, said wireless terminal including the wireless telecommunication means arranged in communication with the second wireless communication device and arranged to communicate via the wireless telecommunication means to the computerized reservation/IT system a reservation and/or check-in request of a terminal user; wherein the computerized reservation/IT system is arranged to automatically generate an electronic key upon receiving from the wireless terminal a hotel reservation and/or check-in request, automatically and wirelessly communicate the electronic key to the wireless terminal that originated the reservation and/or check-in request, and automatically communicate electronically to the remotely operable door lock associated with a hotel room assigned to the user in response to the reservation and/or check-in request information corresponding to the electronic key, and the remotely operable door lock is arranged to:

automatically and wirelessly obtain, without the user of the wireless terminal having to press a button, the electronic key from the wireless terminal if the second wireless device and the first wireless device are mutually in-range, automatically actuate the lock device to enable the user to access the hotel room if the key obtained from the wireless terminal corresponds to the information received from the computerized reservation/IT system, and a wireless monitoring unit in electronic communication with the computerized reservation/IT system, said wireless monitoring unit including a third wireless device and arranged to:

obtain wirelessly a copy of the electronic the key from the wireless terminal if the second wireless device and the third wireless device are mutually in-range, and communicate the copy of the electronic key obtained from the wireless terminal to the reservation/IT system, and wherein the reservation/IT system in response to receiving the copy of the electronic key is arranged to communicate an invalidation command in respect of information corresponding to the electronic key if a reservation period associated with the electronic key has expired.

2. The system of claim 1, wherein the computerized reservationt/IT system is further arranged to automatically communicate a payment request to a payment server arranged in communication with the communication network upon an invalidation of the electronic key if a payment for a reservation associated with the invalidated key has not been registered in the computerized reservation/IT system at the time of invalidation of the information corresponding to the electronic key.

3. The system of claim 1, wherein the reservation and/or check-in request is communicated by means of WAP (WML/WML Script), a web application (HTML/Java Script) or a Java Application/Applet.

4. The system of claim 1, wherein the computerized reservation/IT system is further arranged to encrypt the key to be communicated to the wireless terminal.

5. The system of claim 1, wherein the computerized reservation/IT system is responsive to a check-out request received from the wireless terminal and arranged to act thereupon by communicating to the corresponding remotely operable door lock an invalidation command in respect of information corresponding to the electronic key.

6. A method for providing automatic wireless hotel facility reservation and/or check-in and/or check-out and room access control in a system comprising a communication network interconnecting a telecommunication system adapted to communicate wirelessly with a wireless telecommunication device of a wireless terminal of a user and a computerized reservation/IT system associated with a facility, said computerized reservation/IT system including a means for electronic communication with a remotely operable door lock of the facility, said remotely operable door lock including a lock device and a first wireless device operationally associated with the lock device and adapted to communicate wirelessly with a second wireless device of the wireless terminal, said wireless terminal including the wireless telecommunication means arranged in communication with the second wireless communication device and arranged to communicate via the wireless telecommunication means to the computerized reservation/IT system a reservation and/or check-in request of a terminal user; the method comprising:

automatically generating in the computerized reservation/IT system an electronic key upon receiving from the wireless terminal a hotel reservation and/or check-in request, automatically and wirelessly communicating a copy of the electronic key from the computerized reservation/IT system to the wireless terminal that originated the reservation and/or check-in request, and automatically and electronically communicating from the computerized reservation/IT system to the remotely operable door lock information corresponding to the electronic key, wherein the door lock is associated with a hotel room assigned to the user in response to the reservation and/or check-in request, and automatically and wirelessly obtaining by the remotely operable door lock, without the user of the wireless terminal having to press a button, a copy of the electronic key from the wireless terminal if the second wireless device and the first wireless device are mutually in-range, automatically actuating by the remotely operable door lock the lock device to enable the user to access the hotel room if the copy of the electronic key obtained from the wireless terminal corresponds to the information received from the computerized reservation/IT system, obtaining wirelessly by a third wireless device of a wireless monitoring unit in communication with the computerized reservation/IT system, a copy of the electronic key from the wireless terminal when the second wireless device and the third wireless device are mutually in-range, communicating the obtained copy of the electronic key from the wireless monitoring unit to the computerized reservation/IT system, and invalidating in the computerized reservation/IT system and any connected remotely operable door lock any information corresponding to the copy of the electronic key obtained by the wireless monitoring unit if a reservation period associated with the copy of the electronic key has expired.

7. The method of claim 6, further comprising:
communicating a payment request from the computerized reservation/IT system to a payment server connected to the communication network upon invalidating the key if a payment for a reservation associated with the invalidated key has not been registered in the hotel computerized reservation/IT system at the time of invalidating the key.

8. The method of claim 6, further comprising communicating the reservation and/or check-in request by means of WAP (WML/WML Script), a web application (HTML/Java Script) or a Java Application/Applet.

9. The method of claim 6, further comprising encrypting by the computerized reservation/IT system the electronic key before communicating the electronic key to the wireless terminal.

10. The method of claim 6, further comprising the computerized reservation/IT system responding to a check-out request received from the wireless terminal by communicating to the corresponding remotely operable door lock an invalidation command in respect of information corresponding to the electronic key.

* * * * *

UNITED STATES PATENT AND TRADEMARK OFFICE
CERTIFICATE OF CORRECTION

Figure 6:
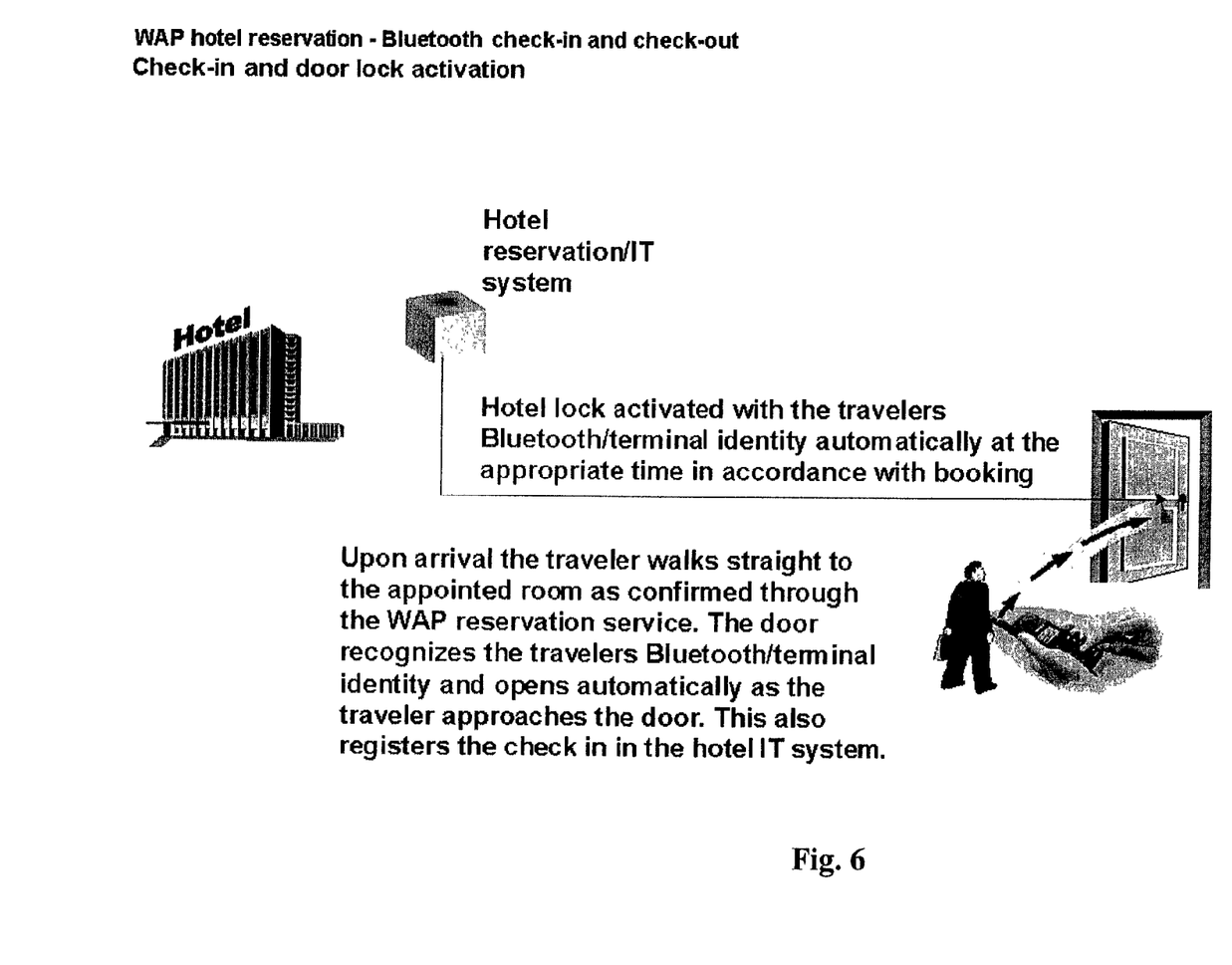
FIG. 6 illustrates an example of a hotel guest arrival scenario with wireless and automatic hotel door lock activation and guest check-in registration employing the invention.

PATENT NO.       : 7,315,823 B2                                   Page 1 of 1
APPLICATION NO.  : 09/788402
DATED            : January 1, 2008
INVENTOR(S)      : Brondrup It is certified that error appears in the above-identified patent and that said Letters Patent is hereby corrected as shown below:

In the Drawings:
In Fig. 6, Sheet 6 of 8, in the row above "Fig. 6" delete "check in in" and insert -- check-in in --, therefor.

In Column 2, Line 49, delete "aireless" and insert -- wireless --, therefor.

In Column 3, Line 10, after "invention" insert -- . --.

In Column 3, Line 51, after "upon" delete "receiving".

In Column 7, Line 7, delete "mueseums" and insert -- museums --, therefor.

In Column 9, Line 51, in Claim 2, delete "reservationt/IT" and insert -- reservation/IT --, therefor.

Signed and Sealed this

Thirtieth Day of September, 2008

JON W. DUDAS
*Director of the United States Patent and Trademark Office*